US008967197B1

(12) United States Patent
Teel, Jr.

(10) Patent No.: US 8,967,197 B1
(45) Date of Patent: Mar. 3, 2015

(54) REMOTE ACTUATOR DEVICE FOR VALVE CONTROL KNOB ON A TANK

(71) Applicant: Richard Herbert Teel, Jr., Wellesley Hills, MA (US)

(72) Inventor: Richard Herbert Teel, Jr., Wellesley Hills, MA (US)

(73) Assignee: Telmore Technologies, Inc., Wellesley Hills, MA (US)

( * ) Notice: Subject to any disclaimer, the term of this patent is extended or adjusted under 35 U.S.C. 154(b) by 165 days.

(21) Appl. No.: 13/758,640

(22) Filed: Feb. 4, 2013

Related U.S. Application Data

(60) Provisional application No. 61/594,217, filed on Feb. 2, 2012.

(51) Int. Cl.
*F16K 37/00* (2006.01)
*F16K 31/46* (2006.01)
*F16K 27/00* (2006.01)

(52) U.S. Cl.
CPC .................................. *F16K 31/46* (2013.01)
USPC ............................. 137/554; 137/377; 251/294

(58) Field of Classification Search
USPC ............... 137/377, 382, 382.5, 554; 251/294
See application file for complete search history.

(56) References Cited

U.S. PATENT DOCUMENTS

| | | | | | |
|---|---|---|---|---|---|
| 204,835 | A | * | 6/1878 | Mathewman | 251/294 |
| 249,169 | A | * | 11/1881 | Grannan | 251/294 |
| 335,404 | A | * | 2/1886 | Walsh et al. | 251/294 |
| 340,495 | A | * | 4/1886 | Eaton et al. | 251/294 |
| 702,060 | A | * | 6/1902 | Haynes | 251/294 |
| 847,870 | A | * | 3/1907 | Young | 251/294 |
| RE13,552 | E | * | 4/1913 | Humphrey | 251/294 |
| 1,095,209 | A | * | 5/1914 | Humphrey | 251/294 |
| 1,095,295 | A | * | 5/1914 | Stevens | 251/294 |
| 1,097,441 | A | * | 5/1914 | Jenkins | 251/294 |
| 1,300,685 | A | * | 4/1919 | Woodcock | 251/294 |
| 1,511,953 | A | * | 10/1924 | Dwyer | 251/294 |
| 1,547,196 | A | * | 7/1925 | Arbon | 251/294 |
| 1,573,287 | A | * | 2/1926 | Williams, Jr. et al. | 251/294 |
| 2,016,801 | A | * | 10/1935 | Duncan | 251/294 |
| 3,308,850 | A | * | 3/1967 | Gill | 251/294 |
| 4,509,387 | A | * | 4/1985 | Tschanz et al. | 251/294 |
| 4,596,377 | A | * | 6/1986 | Taylor | 251/294 |
| 4,657,222 | A | * | 4/1987 | Tullio | 251/294 |
| 4,807,662 | A | * | 2/1989 | Verne | 137/554 |
| 5,518,028 | A | * | 5/1996 | Walker | 137/554 |
| 5,584,319 | A | * | 12/1996 | Cholin | 137/554 |
| 6,945,509 | B2 | * | 9/2005 | Royse | 137/554 |
| 7,784,490 | B1 | * | 8/2010 | Stewart et al. | 137/554 |
| 8,413,957 | B2 | * | 4/2013 | Fandel | 251/294 |
| 2004/0113116 | A1 | * | 6/2004 | London et al. | 251/294 |

* cited by examiner

*Primary Examiner* — John Rivell
(74) *Attorney, Agent, or Firm* — Lisa M. Warren, Esq.; Morse, Barnes-Brown & Pendleton, P.C.

(57) ABSTRACT

A remote actuator device for a valve control knob on a tank (e.g., storage tank) is disclosed.

12 Claims, 12 Drawing Sheets

(cross-sectional view)

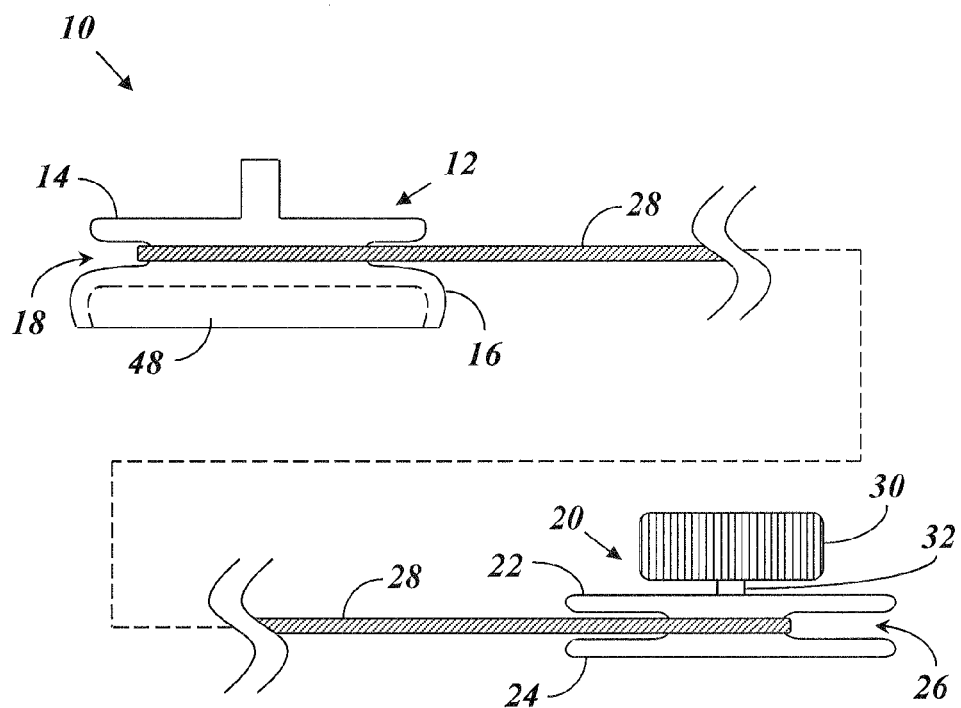
FIG. 1A (side view)

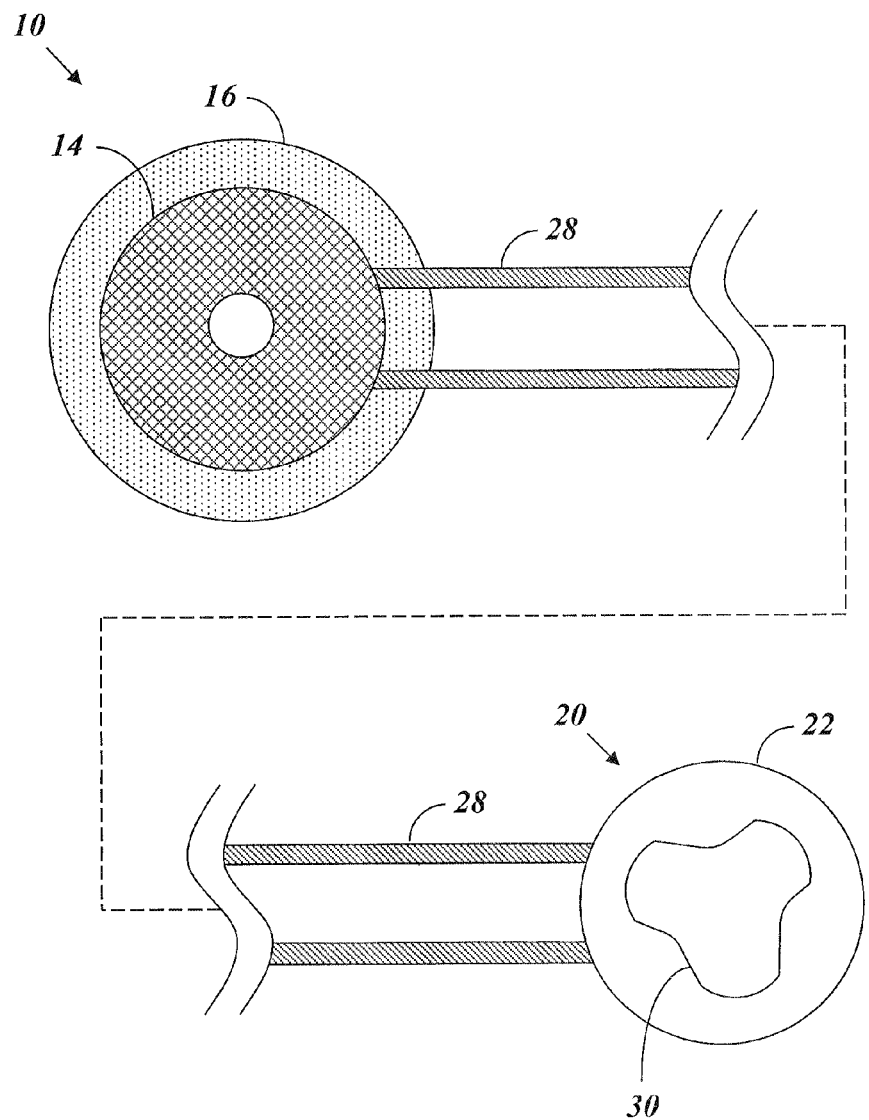
FIG. 1B (top view)

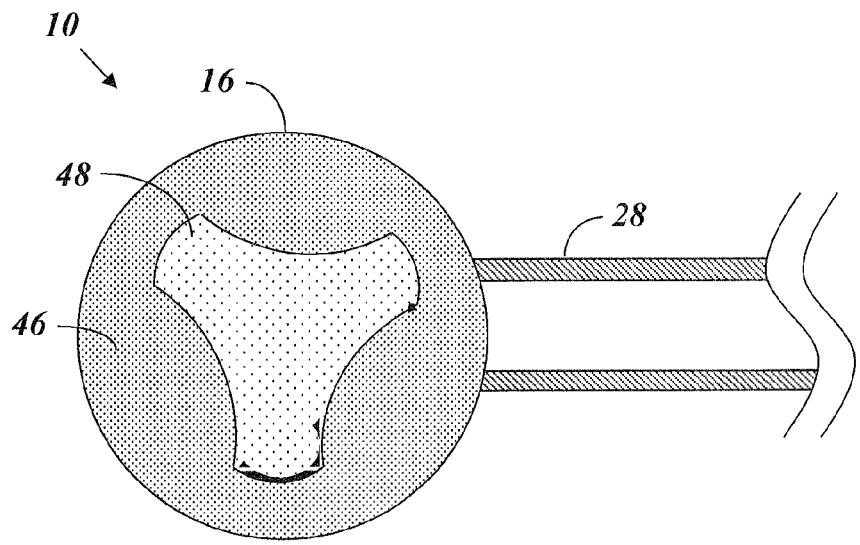
FIG. 3 *(bottom view)*

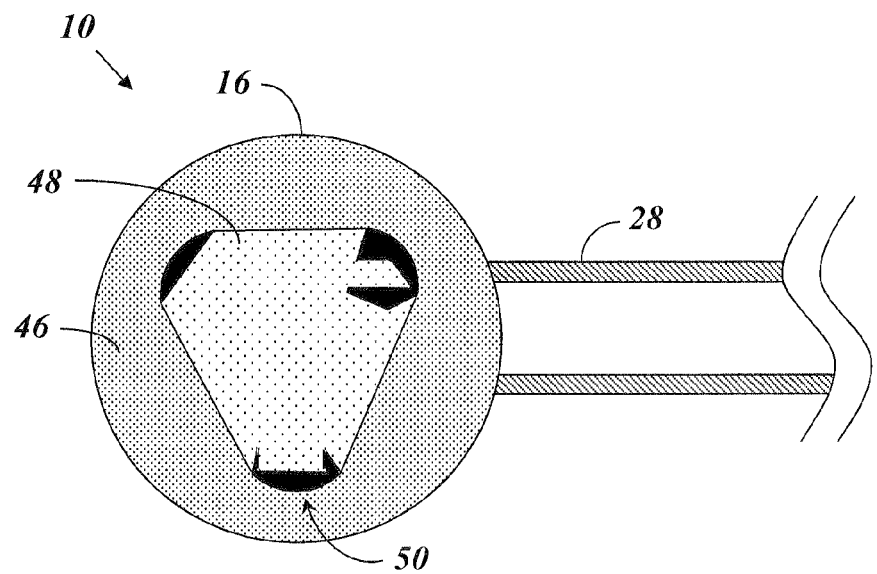
*FIG. 5 (bottom view)*

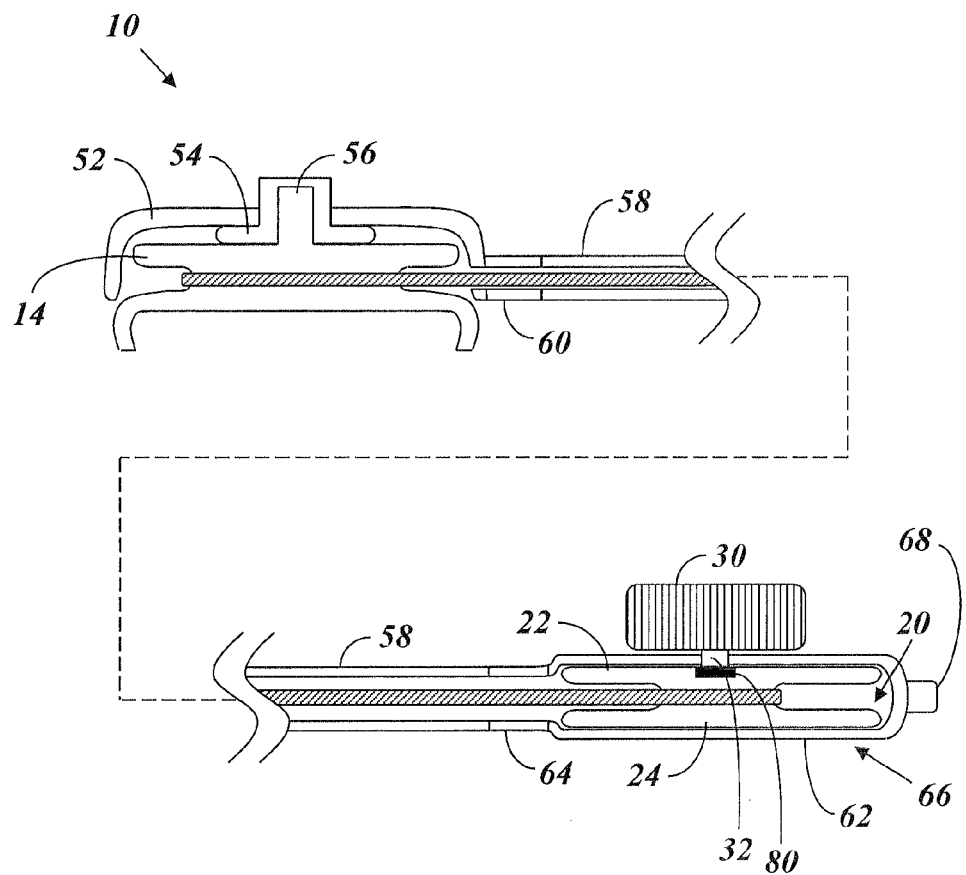
FIG. 6A (cross-sectional view)

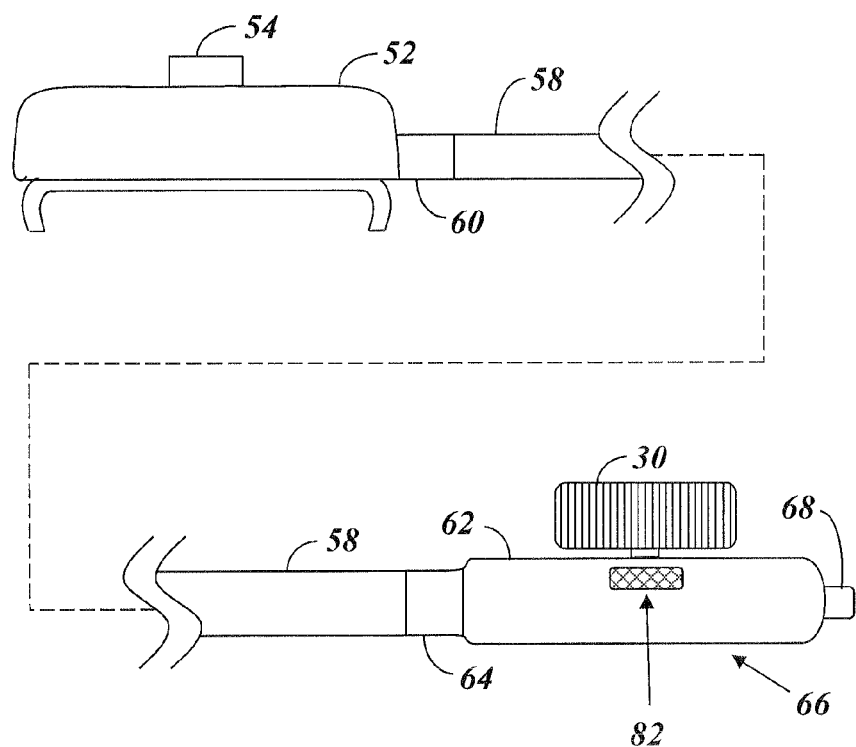
*FIG. 6B (side view)*

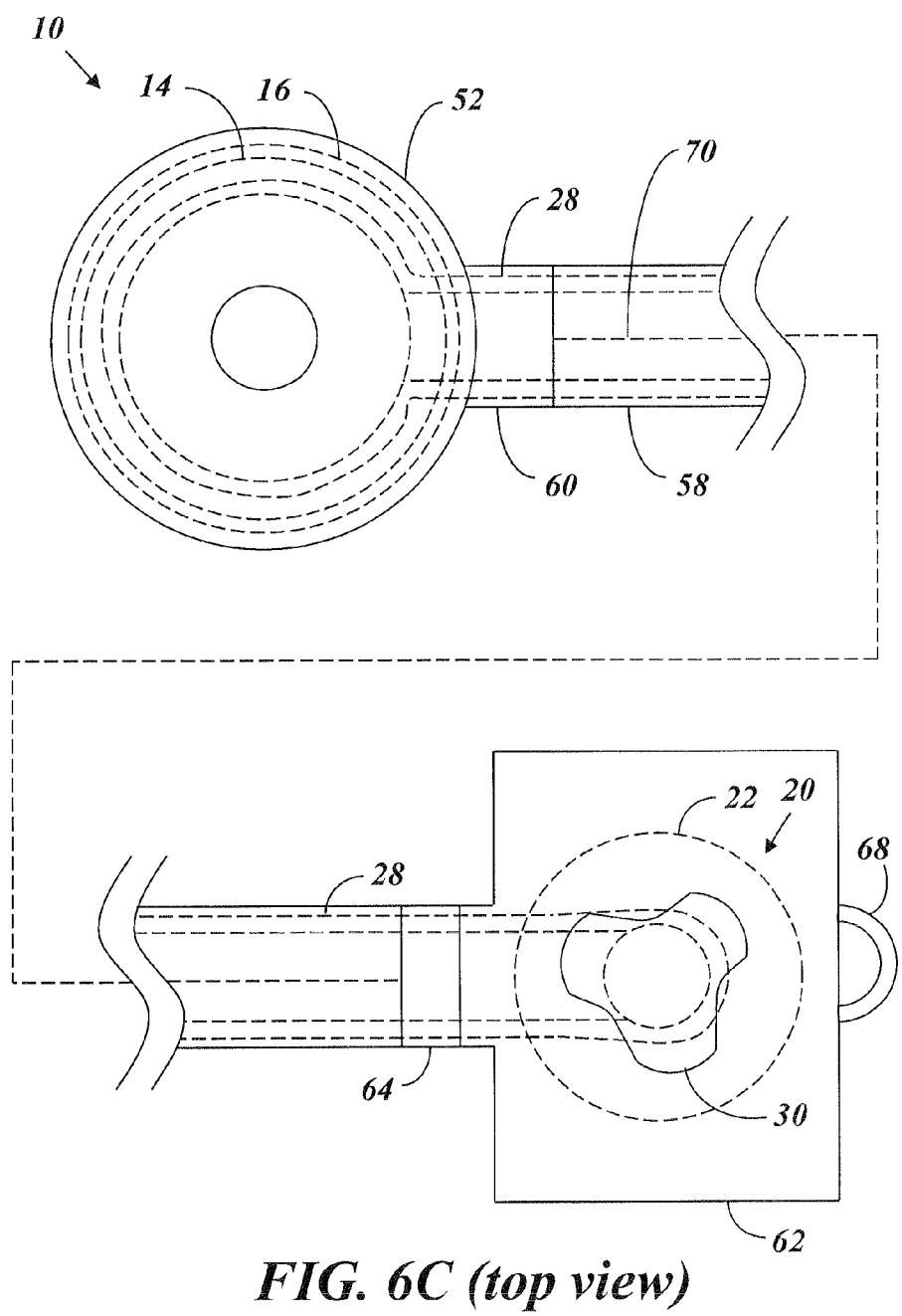
FIG. 6C (top view)

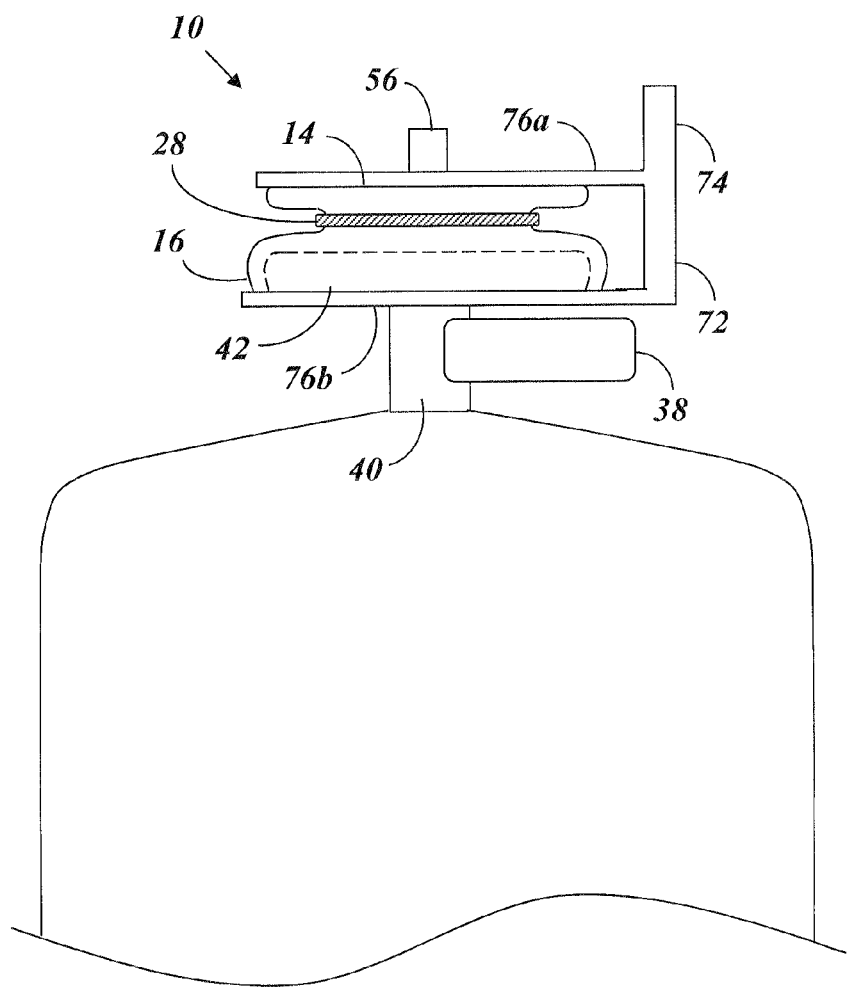
FIG. 7 (back view)

REMOTE ACTUATOR DEVICE FOR VALVE CONTROL KNOB ON A TANK

RELATED APPLICATION

This application claims priority to, and the benefit of, U.S. Provisional Application No. 61/594,217, filed on Feb. 2, 2012. The entire teachings of the above application are incorporated herein by reference.

BACKGROUND

Gas grills utilize fuel tanks (e.g., propane tanks) that are commonly situated in a lower cabinet or other position located below the grilling rack. As such, during operation of gas grills, users frequently must turn on and off the propane tanks, in order to reduce the likelihood of gas leakage when the grill is not in use. This often involves the user's routinely bending down to turn a knob on a valve that controls flow of the fuel from the fuel tank into the grill (hereinafter referred to as a "valve control knob"). For many grill users, this regular bending motion and reaching around to access the valve control knob is awkward and can cause stress and strain on the back (e.g., lower back) and arms, scraped knees, dirty clothes, as well as other discomforts and inconveniences resulting from reaching around or into a dark, sometimes dirty, cabinet.

Some gas grill makers have attempted to solve this problem by providing a secondary valve situated downstream of the valve control knob. The second valve is placed at a convenient location, such as on the front face of the grill. However, many users feel that this safety measure is insufficient, and that additional precaution is needed in the form of physically turning the valve control knob on the fuel tank (e.g., propane tank). Generally, due to the perceived risk of gas leakage, users feel uncomfortable with allowing the valve control knob to remain in an "on" position for an extended period of time during which the gas grill is not being used. As such, current solutions fail to provide a suitable mechanism for physically turning the valve control knob of a fuel tank (e.g., propane tank) of a gas grill between an "on" and an "off" position.

SUMMARY

There is a need for a device for actuating (i.e., physically moving) the valve control knob of a tank (e.g., a storage tank). The embodiments provided herein are directed toward solutions to address this and other needs, in addition to having other desirable characteristics that will be appreciated by one of skill in the art upon reading the present specification.

According to one embodiment, a remote actuator device is provided for a valve control knob on a tank. The remote actuator device includes a sheave formed of an upper flange, a lower flange, and a recess between the upper flange and the lower flange. An outward-facing portion of the lower flange forms a mating member for coupling with the valve control knob on the tank. The remote actuator device further includes a rotatable member configured to be placed at a position distal to the sheave. A looped drive element is situated around the rotatable member and in the recess of the sheave. A control device is coupled to the rotatable member and configured to actuate rotation of the rotatable member. Actuation by the control device of the rotatable member generates a rotation of the sheave capable of turning the valve control knob on the tank.

According to further embodiments, the remote actuator device further can include one or more housing elements enclosing one or more of the looped drive element, the sheave, or the rotatable member. The remote actuator device further can include a clamp for securing the sheave to the tank. The rotatable member can include a second sheave formed of an upper flange, a lower flange, and a recess between the upper flange and the lower flange. The looped drive element can include a band, a belt, a rope, a cable, a wire, or a chain. The control device can include a knob fixedly coupled to the rotatable member (e.g., by a stem, an axel, a rod, a pin, etc.). The remote actuator device can include a fastening device for securing the sheave to the tank. The fastening device can include a clamp.

According to further embodiments, the remote actuator device further can include a housing containing all or part of the rotating member, a cover containing all or part of the sheave, and a tubular housing member containing all or part of the looped drive element. The housing and the cover can be coupled at least in part by tubular housing member. The remote actuator device further can include one or more attachment mechanisms coupled to the housing. The one or more attachment mechanisms can enable the housing to be attached to, e.g., a grill. The one or more fastening mechanisms can include one or more of: a magnet, a hook, and a strap. The remote actuator device further can include a light source coupled to the housing containing all or part of the rotating member. One or more detection mechanisms further can be included and coupled to the light source for sensing whether the valve control knob is in a closed position or an open position. The light source can be configured to provide a first visual indication when the one or more detection mechanisms detect that the valve control knob is in the closed position and a second visual indication that is different from the first visual indication when the one or more detection mechanisms detect that the valve control knob is in the open position. For example, the first visual indication can include the light source being turned off (i.e., no illumination provided), and the second visual indication can include the light source being turned on (i.e., illumination provided). Alternatively, the first visual indication can include an illumination of a first color of light, and the second visual indication can include an illumination of a second color of light.

BRIEF DESCRIPTION OF THE FIGURES

These and other characteristics of the present invention will be more fully understood by reference to the following detailed description in conjunction with the attached drawings, in which:

FIG. 1A is a side view of an example embodiment of a remote actuator device that includes a sheave coupled by a looped drive element to a rotating element;

FIG. 1B is a top view of the example embodiment of the remote actuator device of FIG. 1A;

FIG. 3 is a bottom view of one example embodiment of the sheave of FIGS. 1A and 1B;

FIG. 5 is a bottom view of another example embodiment of the sheave of FIGS. 1A and 1B;

FIG. 6A is a cross-sectional side view of the example embodiment of the remote actuator device of FIGS. 1A and 1B further including one or more housing elements;

FIG. 6B is a side view of the example embodiment of the remote actuator device of FIG. 6A that further includes the cover;

FIG. 6C is a top view of the remote actuator device of FIG. 6A that further includes the cover;

FIG. 7 is a back view of an example system including the remote actuator device of FIGS. 1A and 1B situated on the storage tank of FIG. 2 further with an example embodiment of a clamp situated thereon;

DETAILED DESCRIPTION

Figure 2:
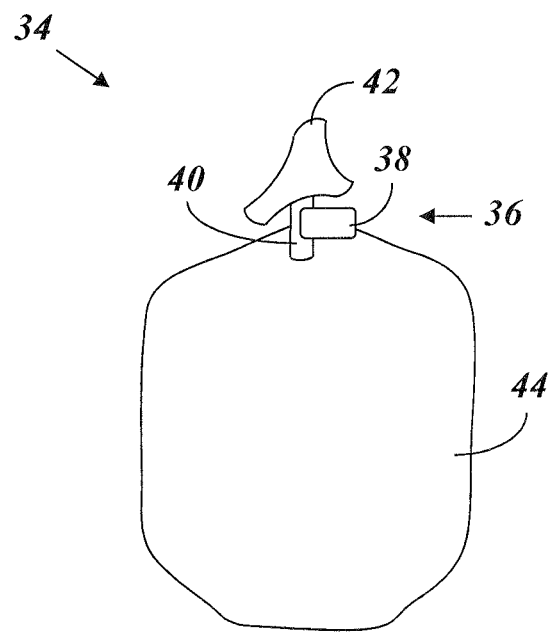
FIG. 2 is a conventional storage tank.

An illustrative embodiment described herein relates to a remote actuator device for actuating a valve control knob on a tank (e.g., a storage tank). The remote actuator device generally includes two ends, one of which comprises a sheave and a second of which comprises a rotating member coupled to a control device. The sheave is sized and dimensioned to be placed on the valve control knob of the tank (e.g., storage tank), and the control device is configured to be placed (e.g., mounted) to a convenient location distal to the sheave, e.g., at a location remote from the valve control knob of the tank (e.g., storage tank). The rotating member and the sheave are coupled by a looped drive element, such that the control device can be used to actuate turning motion of the valve control knob from the remote position of the control device.

For example, in embodiments where the remote actuator device is used for remotely turning the valve control knob of a fuel tank (e.g., a propane tank), the control device can be placed on the front face of a gas grill at an easily accessible location. This allows the operator or owner of the grill to easily turn the valve control knob of the fuel tank (e.g., propane tank) without having to bend over and reach down to the valve control knob.

FIGS. 1 through 8B, wherein like parts are designated by like reference numerals throughout, illustrate example embodiments of a remote actuator device for a valve control knob of a tank (e.g., a storage tank). Although the various embodiments will be described with reference to the examples illustrated in the figures, it should be understood that many alternative forms can be embodied. One of skill in the art will appreciate many different ways to alter the parameters of the embodiments disclosed, such as the size, shape, or type of elements or materials, in a manner still in keeping with the spirit and scope of the present disclosure.

FIG. 1A depicts a side view of a remote actuator device 10 for a valve control knob of a tank. FIG. 1B depicts the remote actuator device of FIG. 1A from a top view. The remote actuator device 10 includes a sheave 12 formed of an upper flange 14, a lower flange 16, and a recess 18 between the upper flange 14 and the lower flange 16. The remote actuator device 10 also includes a rotatable member 20 that is independent the sheave 12. As one non-limiting example, the rotatable member 20 can form a second sheave (as depicted in the example embodiment of FIG. 1), which includes an upper flange 22, a lower flange 24, and a recess 26 therebetween.

The rotatable member 20 and the sheave 12 are coupled to one another by a looped drive element 28. More specifically, the looped drive element 28 is situated around the rotatable member 20 and in the recess 18 of the sheave 12. As a few non-limiting examples, the looped drive element 28 can be a band, a belt, a rope, a cable, a wire, a chain, or any other suitable looped drive element capable of generating rotation in the sheave 12 based on actuated rotation of the rotatable member 20. In the example embodiment of FIG. 1 which provides that the rotatable member 20 is a second sheave, the looped drive element 28 is situated in the recess 26 of the second sheave. The looped drive element 28 synchronizes rotational motion of the sheave 12 and the rotatable member 20. Accordingly, rotation of the rotatable member 20 generates rotation of the sheave 12 (e.g., at an equal angular rate or a different angular rate).

A control device 30 is coupled to the rotatable member 20 for actuating rotational motion of the rotatable member 20, and thus also of the sheave 12. As one non-limiting example, the control device 30 can be a rotatable knob or handle coupled to rotatable member 20 by a shaft 32, such that rotation of the control device 30 causes the rotatable member 20 to turn. The control device 30 thus can be used to actuate rotational motion of the sheave 12 despite being placed at a position distal to the sheave 12.

The sheave 12 is configured to securely couple with a valve control knob of a tank (e.g., a storage tank). FIG. 2 depicts one example of a storage tank 34 from a perspective view. The storage tank 34 can be any conventional or suitable storage tank whose contents include a flowable material, such as one or more gasses (e.g., propane, helium, and any other suitable gas), one or more liquids (e.g., water, liquid fuel, etc.), one or more slurries, and/or any other flowable material(s). In illustrative embodiments, the storage tank 34 is a propane tank for use in a gas grill. The storage tank 34 generally includes a valve 36 and a chamber body 44. In the example embodiment of FIG. 2, the valve 36 includes an outlet channel 38, a stem 40, and a valve control knob 42 that controls flow of contents from the chamber body 44 to the outlet channel 38. The valve control knob 42 generally is controlled by a turning motion.

Accordingly, to enable coupling between the valve control knob 42 and the remote actuator device 10, an outward-facing (e.g., downward facing, in the orientation of FIG. 1) portion of the lower flange 16 of the sheave 12 forms a mating member with the valve control knob 42 on the storage tank 34. For example, FIG. 3 depicts the sheave 12 from a bottom view. As depicted in the example embodiment of FIG. 3, the lower flange 16 includes a protrusion 46 extending downward and having a shape that forms a cavity 48 that substantially conforms to some or all of the shape of the valve control knob 42. Accordingly, the cavity 48 of the lower flange 16 forms a female mating member configured to receive the valve control knob 42.

Figure 4A:
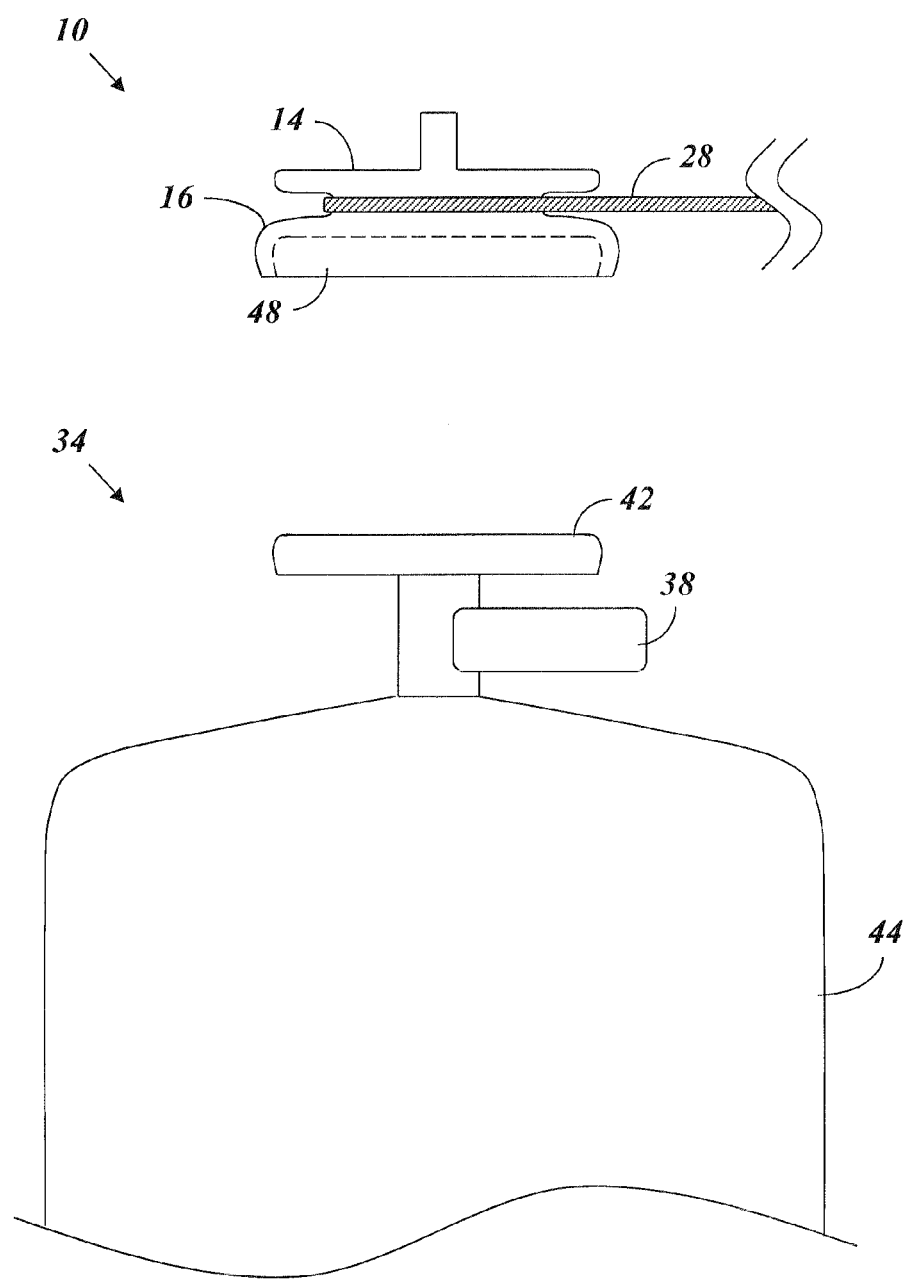
FIG. 4A is a side view of an example system in which the remote actuator device of FIGS. 1A and 1B is situated above the storage tank of FIG. 2 for placement thereon.
Figure 4B:
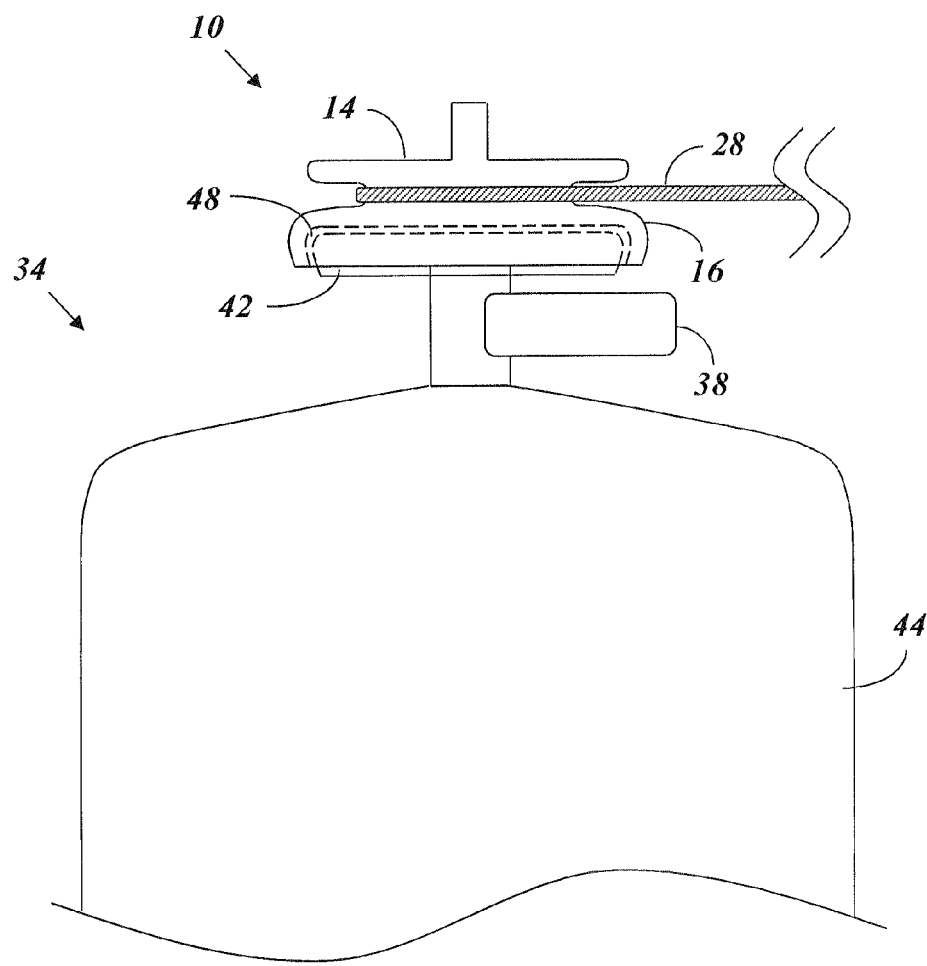
FIG. 4B is a side view of the system of FIG. 4A, in which the remote actuator device is almost completely situated on the valve control knob of the storage tank.

FIGS. 4A and 4B depict the sheave 12 receiving the valve control knob 42 of the storage tank 34. In FIG. 4A the sheave 12 is being lowered toward the storage tank 34, and in FIG. 4B the valve control knob 42 is almost completely received by the lower flange 16. As depicted in the example embodiments of FIGS. 4A and 4B, as the sheave 12 is lowered onto the storage tank 34, the valve control knob 42 enters by the cavity 48, e.g., with a hand-in-glove fit. Accordingly, once the lower flange 16 of the sheave 12 is placed on the valve control knob 42, the control device 30 can be used to remotely actuate (e.g., remotely turn) the valve control knob 42.

One of skill in the art will appreciate that the particular design depicted in FIG. 3 is illustrative and in no way limits the embodiments disclosed herein. Rather, the shape and size of the protrusion 46 cavity 48 can be selected to form a mating member with any valve control knob on any suitable tank (e.g., storage tank). Furthermore, it should be appreciated that the protrusion 46 alternatively can be formed of two or more non-contiguous protrusions that are shaped, sized, and positioned on the lower flange 16 to adequately provide a rotational force against the valve control knob 42.

For instance, FIG. 5 depicts another example embodiment of the outward-facing portion of the lower flange 16 of the sheave 12. In the embodiment of FIG. 5, the protrusion 46 forms the cavity 48 generally resembling a triangle with rounded ends, for receiving the valve control knob 42 of the storage tank 34 of FIG. 2. Situated at the three rounded ends of the triangle shape can be three support cups 50 that dip up (e.g., into the page, as oriented in FIG. 5). The support cups 50 are shaped to receive the ends of the three appendages on the valve control knob 42. As such, the support cups 50 form walls that tightly fit around the ends of the three appendages on the valve control knob 42 and thus are capable of applying a rotational force against the valve control knob 42.

According to further embodiments, some or all of the remote actuator device 10 can be enclosed in one or more housing elements. For example, FIGS. 6A, 6B, and 6C depict the remote actuator device 10 with various housing elements from a cross-sectional view, a side view, and a top view, respectively. In the example embodiment of FIGS. 6A through 6C, the remote actuator device 10 further includes a cover 52 disposed over the upper flange 14. The cover 52 extends over and is coupled to a cap 54 that can be coupled to a stem 56 extending upward from the upper flange 14. The cap 54 can be formed of a low-friction material and can effectively server as a washer and bearing for preventing buildup of friction between the stem 56 and the cover 52 or between the upper flange 14 and the cover 52. The cover 52 can be fixedly coupled with the cap 54 using any suitable mechanism (e.g., adhesives, fastening mechanisms, etc.), as would be readily appreciated by one of skill in the art.

The cover 52 can couple with a first end of a flexible, tubular housing member 58, e.g., via a connection piece 60. As just one non-limiting example, the tubular housing member 58 can be a hose with a nozzle and the connection piece 60 can be a threaded channel affixed to the cover 52 for receiving the nozzle on the hose. A second end of the tubular housing member 58 can couple with a housing 62 containing the rotatable member 20, e.g., via a second connection piece 64. In the example embodiment of FIGS. 6A through 6C, the housing 62 completely encloses the rotatable member 20, as depicted. To reduce friction between the housing 62 and the rotatable member 20, a layer of low-friction material (not shown) can be situated between the housing 62 and the rotatable member. For example, a top washer (not shown) can be situated between the housing 62 and the upper flange 22, and a bottom washer (not shown) can be situated between the housing 62 and the lower flange 24. Furthermore, the shaft 32 can pass through a bearing (not shown) in order to reduce frictional forces between the shaft 32 and the housing 62. To control the tension of the looped drive element 28, a tensioner, spring, or other tension adjuster (not shown) may be included in the housing 62, as would be appreciated by one of skill in the art upon reading the present specification. The housing 62 can have a magnetized face 66 (e.g., formed of a magnet, situated above a magnetic insert, etc.) substantially opposite the face of the housing 62 from which the control device 30 extends. The magnetized face 66 can be useful, for example, in mounting the control device 30 at a convenient location distal the valve control knob 42. Alternatively or additionally, a mounting hook or strap 68 can be included for hanging the control device 30 at such a location.

In addition, in some further embodiments, the housing 62 includes a battery compartment (not shown) for receiving a battery and an LED light or other light source (82) that is powered by the battery. The LED light or other light source can be included for the purpose of alerting an operator of the grill whether the valve 36 is in an open or closed position. Accordingly, one or more detection mechanisms (e.g., flow sensors, pressure sensors, etc.) can be included for determining whether the valve 36 is in an open or a closed position. The one or more detection mechanisms (80) can be coupled to the LED light or other light source, e.g., in such a way that the one or more detection mechanisms control the LED light or other light source. For example, using one or more circuit elements (e.g., a switch, etc.), the LED light or other light source can be turned off if the one or more detection mechanisms detect that the valve 36 is in a closed position and the LED light or other light source can be turned on if the one or more detection mechanisms detect that the valve 36 is in an open position, as would be appreciated by one of skill in the art upon reading the present specification.

As depicted in FIG. 6C, the tubular housing member 58 can include a divider 70 (e.g., forming a wall) for separating the two sides of the looped drive element 28 and ensuring that the looped drive element 28 does not come into contact with itself during operation. Other separation components are possible. For example, two guide cables could be included within the length of the tubular housing member 58, each of which can house a different side of the looped drive element 28. Yet other alternatives are possible, and will be appreciated by one of skill in the art upon reading the present specification. All such embodiments are encompassed by the present disclosure.

Figure 8A:
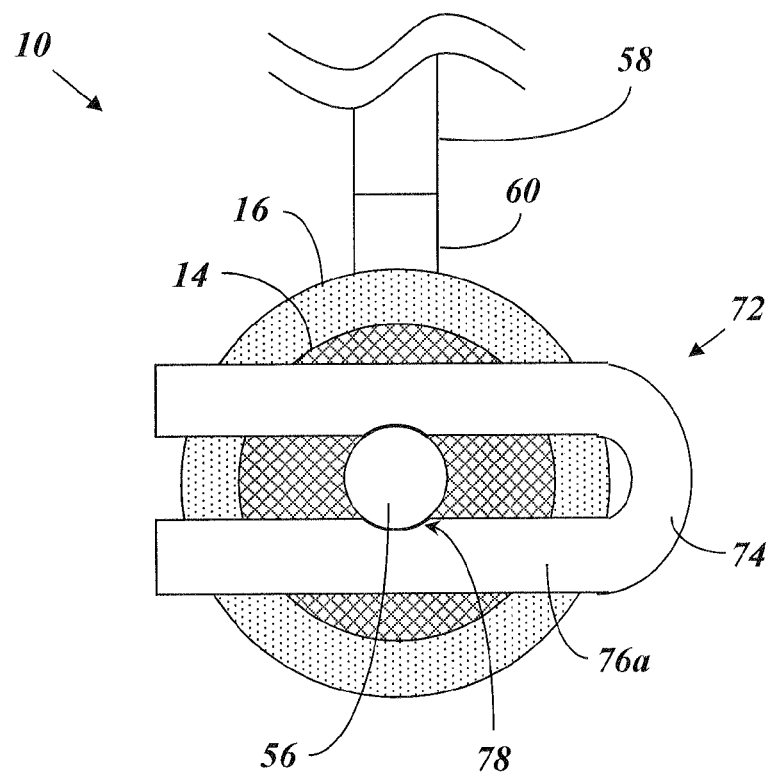
FIG. 8A is a top view of the example system of FIG. 7.
Figure 8B:
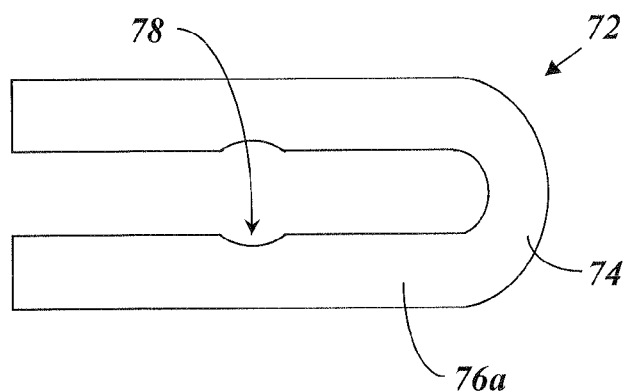
FIG. 8B is a top view of the example embodiment of the clamp of FIG. 8A.

The remote actuator device 10 further can include a clamp for securing the sheave 12 to the valve control knob 42. For example, FIG. 7 depicts a back view of a system including the remote actuator device 10 and such a clamp 72. As depicted, the clamp 72 can include a handle 74 and an upper appendage 76a and a lower appendage 76b that clip on to the stem 56 of the sheave 12 and the stem 40 of the storage tank 34, respectively. FIG. 8A further depicts the system of FIG. 7 from a top view. FIG. 8B depicts a top view of the clamp 72 in isolation from the remote actuator device 10. As can be seen from FIGS. 8A and 8B, the upper and lower appendages 76a, 76b of the clamp 72 each includes an indentation 78 for fitting around the stem 56 of the sheave 12 and the stem 40 of the storage tank 34, respectively.

In the example embodiment of FIGS. 7 and 8A the remote actuator device 10 is depicted absent the housing elements of FIGS. 6A through 6C. However, one of skill in the art will appreciate upon reading the present specification that the clamp 72 similarly can be utilized with the remote actuator device 10 when the housing elements of FIGS. 6A through 6C are included. For example, the upper appendage 76a can clip over the cap 54 and onto the stem 56 of the sheave 12.

The upper flange 14, the lower flange 16, and the stem 56 generally can all be one single continuous piece of material (e.g., plastic, metal, and the like). Alternatively, one or more of these pieces can be manufactured separately and adjoined during construction of the remote actuator device 10 (e.g., by adhesives, fasteners, and the like). The cap 54 can be formed of any suitable (e.g., low-friction) material, including plastic, metal, and the like. The cover 52 for the sheave 12 and the housing 62 containing the rotatable member 20 can be any suitable material (e.g., plastic, rubber, metal, and the like). The tubular housing member 58 and/or the divider 70 can be formed of a durable, low-friction material, such as polytetrafluoroethylene. Alternatively or additionally to utilizing a low-friction material, the tubular housing member 58 and/or divider can include a fluoropolymer coating on any inward-facing surfaces that may come into contact with the looped drive element 28. In the example embodiment of FIGS. 1 through 8B in which the control device 30 is a knob, the knob can be constructed of any suitable material (e.g., wood, plastic, rubber, metal, and the like). In general, the materials provided herein are exemplary and in no way limiting of the disclosed embodiments. Rather, one of skill in the art will readily appreciate a wide variety of alternative materials for implementing the remote actuator device 10 upon reading the present specification. All such alternatives and modifications are contemplated within the scope of the disclosure.

The illustrative embodiments provided herein offer numerous benefits. For example, using the remote actuator device 10, owners and operators of gas grills (e.g., which utilize fuel from a propane tank) can more easily turn on and off the propane tank (or other fuel tank) remotely, without having to bend down or reach around or inside an internal cabinet section of the gas grill housing the propane tank (or other fuel tank). Additionally, in embodiments providing an LED light or other light source situated on the housing 62 at a visible location, the LED light or other light source can provide users of the grill with the convenience of knowing with greater certainty that the valve 36 is in an open position or a closed position. This can help reduce doubt in the mind of the user and/or assist in reducing risk of gas leakage when the grill is not in use. One of skill in the art will appreciate numerous other benefits and usages upon reading the present specification.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A remote actuator device for a valve control knob on a tank, the remote actuator device comprising:
a sheave comprising an upper flange, a lower flange, and a recess between the upper flange and the lower flange, wherein an outward-facing portion of the lower flange forms a mating member for coupling with the valve control knob on the tank;
a rotatable member configured to be placed at a position distal to the sheave;
a looped drive element situated around the rotatable member and in the recess of the sheave; and
a control device coupled to the rotatable member and configured to actuate rotation of the rotatable member;
wherein actuation by the control device of the rotatable member generates a rotation of the sheave capable of turning the valve control knob on the tank.

2. The remote actuator device of claim 1, further comprising one or more housing elements enclosing one or more of the looped drive element, the sheave, or the rotatable member.

3. The remote actuator device of claim 1, further comprising a housing containing all or part of the rotating member, a cover containing all or part of the sheave, and a tubular housing member containing all or part of the looped drive element.

4. The remote actuator device of claim 3, further comprising one or more attachment mechanisms coupled to the housing, the one or more fastening mechanisms enabling the housing to be attached to a grill.

5. The remote actuator device of claim 4, wherein the one or more fastening mechanisms comprise one or more of: a magnet, a hook, and a strap.

6. The remote actuator device of claim 3, further comprising:
a light source coupled to the housing containing all or part of the rotating member; and
one or more detection mechanisms coupled to the light source for sensing whether the valve control knob is in a closed position or an open position;
wherein the light source is configured to provide a first visual indication when the one or more detection mechanisms detect that the valve control knob is in the closed position and a second visual indication different from the first visual indication when the one or more detection mechanisms detect that the valve control knob is in the open position.

7. The remote actuator device of claim 1, further comprising a clamp for securing the sheave to the tank.

8. The remote actuator device of claim 1, wherein the rotatable member comprises a second sheave comprising an upper flange, a lower flange, and a recess between the upper flange and the lower flange.

9. The remote actuator device of claim 1, wherein the looped drive element comprises a band, a belt, a rope, a cable, a wire, or a chain.

10. The remote actuator device of claim 1, wherein the control device comprises a knob fixedly coupled to the rotatable member.

11. The remote actuator device of claim 1, further comprising a fastening device for securing the sheave to the tank.

12. The remote actuator device of claim 11, wherein the fastening device comprises a clamp.

* * * * *